(12) United States Patent
Chang

(10) Patent No.: US 10,061,597 B2
(45) Date of Patent: Aug. 28, 2018

(54) COMPUTING DEVICE WITH FIRST AND SECOND OPERATING SYSTEMS

(71) Applicant: HEWLETT-PACKARD DEVELOPMENT COMPANY, L.P., Houston, TX (US)

(72) Inventor: Ming-Te Chang, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 15/309,542

(22) PCT Filed: Jul. 31, 2014

(86) PCT No.: PCT/US2014/049084
§ 371 (c)(1),
(2) Date: Nov. 8, 2016

(87) PCT Pub. No.: WO2016/018349
PCT Pub. Date: Feb. 4, 2016

(65) Prior Publication Data
US 2017/0185416 A1    Jun. 29, 2017

(51) Int. Cl.
G06F 9/44    (2018.01)
G06F 13/24    (2006.01)
G06F 9/4401    (2018.01)

(52) U.S. Cl.
CPC ............ *G06F 9/442* (2013.01); *G06F 9/4406* (2013.01); *G06F 13/24* (2013.01)

(58) Field of Classification Search
CPC ......... G06F 13/24; G06F 9/4406; G06F 9/442
See application file for complete search history.

(56) References Cited

U.S. PATENT DOCUMENTS

| | | | |
|---|---|---|---|
| 7,124,290 B2 | 10/2006 | Larvoire et al. | |
| 7,305,577 B2 | 12/2007 | Zhang | |
| 7,827,396 B2 | 11/2010 | Amou | |
| 8,042,117 B2 | 10/2011 | Ohta et al. | |
| 2003/0229768 A1* | 12/2003 | Kawano | G06F 9/4406 711/165 |
| 2006/0070032 A1 | 3/2006 | Bramley et al. | |
| 2007/0022258 A1* | 1/2007 | Panabaker | G06F 9/4418 711/149 |
| 2010/0064126 A1 | 3/2010 | Hyejung et al. | |
| 2013/0297924 A1 | 11/2013 | Laue et al. | |
| 2016/0328241 A1* | 11/2016 | Song | G06F 9/4403 |

FOREIGN PATENT DOCUMENTS

EP   1037133   9/2000
JP   H09-319637 A   12/1997

OTHER PUBLICATIONS

Wu, M. et al.; "Implementing Dual OS Solutions with UEFI Firmware"; Feb. 22, 2014; 47 pages.

* cited by examiner

*Primary Examiner* — Terrell S Johnson
(74) *Attorney, Agent, or Firm* — HPI Patent Department

(57) ABSTRACT

In one example in accordance with the present disclosure, a computing device utilizes a basic input/output system (BIOS) to program a chipset to generate an interrupt, loads a first and an operating system, receives the interrupt from the chipset; and causes aspects of one operating system to be stored in a partition within a storage device.

15 Claims, 5 Drawing Sheets

COMPUTING DEVICE WITH FIRST AND SECOND OPERATING SYSTEMS

BACKGROUND

In today's computing environment, most computing devices (e.g., desktops, notebooks, workstations, tablets, and smartphones) run a single operating system (OS). Generally, the OS is software that manages the computing device's hardware components and provides common services for various application programs. Popular OSs include Microsoft Windows®, Mac OS X®, Android®, and Linux®.

For some users, however, a single OS does not meet their respective needs, and therefore these users utilize computing devices with multiple OSs. These computing devices are often referred to as dual-OS devices, and provide the ability to switch between two distinct OSs. For example, the user may switch back and forth between Microsoft Windows 8® and Android®, or, alternatively, switch back and forth between Mac OS X® and Microsoft Windows®. Among other things, for example, this may enable the user to use one OS for productivity and work related tasks, and use the other OS to gain access to touch-optimized applications.

With regard to operation, in general, the computing device loads both OSs and runs one OS while suspending operation of the other OS. The user can typically switch between the two OSs by selecting a hotkey or icon.

BRIEF DESCRIPTION OF THE DRAWINGS

Examples are described in the following detailed description and in reference to the drawings, in which.

NOTATION AND NOMENCLATURE

Figure 1:
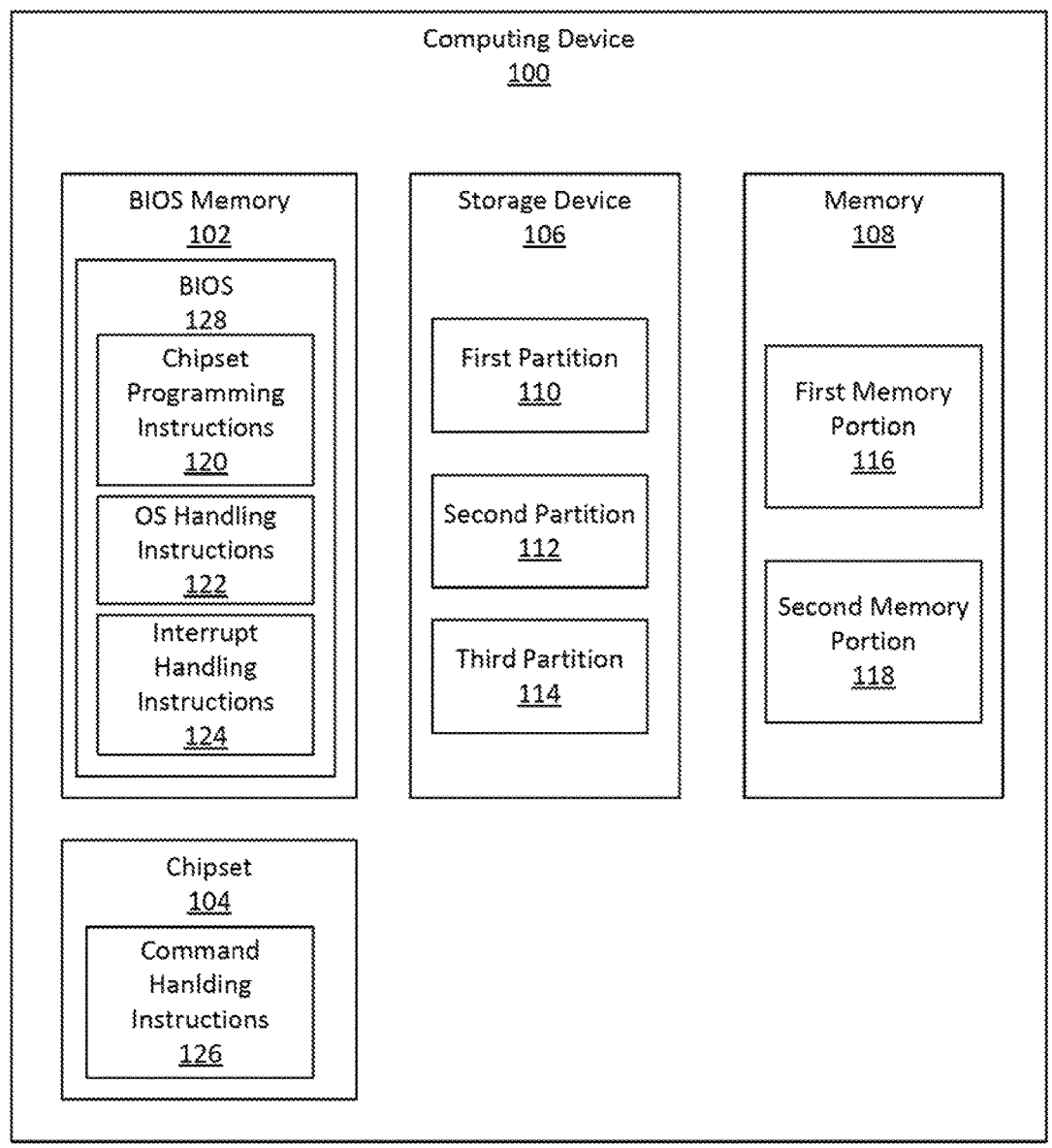
FIG. 1 depicts an example computing device in accordance with an implementation of the present disclosure.

Certain-terms are used throughout the following description and claims to refer to particular system components. As one skilled in the art will appreciate, technology companies may refer to components by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection.

Additionally, the term "BIOS memory" should be interpreted to mean a memory such as a read-only memory (ROM) or Flash memory which stores the basic input/output system (BIOS). The term "BIOS" as used herein should be interpreted as machine-readable instructions to perform various startup functions of a computing device, such as, e.g., initializing and testing hardware, loading bootstrap code, and/or loading the operating system(s) from a storage device. In some implementations, the "BIOS" as described herein is part of a unified extensible firmware interface (UEFI). The term "chipset" should be interpreted to mean at least one component on the computing device motherboard that conducts tasks such as, e.g., dataflow management between a central processing unit (CPU), memory, storage, and/or peripherals. In some examples, at least a portion of the chipset may be integrated in the CPU, while in other implementations the chipset may be discrete from the CPU. Furthermore, in some implementations the chipset may be referred to by another name, such as, e.g., the Platform Controller Hub (PCH).

Additionally, the term "running" or "executing" with respect to an OS generally means that the OS is currently being executed and is currently the active OS in the dual-OS computing device. By contrast, the term "suspended" with respect to an OS generally means that, for at least the most part, the OS is not being executed and it is currently the inactive OS in the dual-OS computing device. Finally, the term "current environment" with respect to an OS should be interpreted to mean (i) the operational state of components associated with the computing device (e.g., the operational state of the CPU, chipset, CPU, codec, I/O component, and/or peripheral components), (ii) the context of at least one application (e.g., the state of a document in a word processing application and/or email draft in an email application), and/or (iii) the context of the first/second operating system prior to shutdown (e.g., process(es) state (e.g., new, ready, running, waiting, terminated), application state, user login status, register entries, and/or scheduling information).

DETAILED DESCRIPTION

As discussed above, dual-OS computing devices are popular for a segment of users that desire the ability to take advantage of the benefits of different OSs. For example, a user may utilize one OS for productivity tasks and the other OS for gaming tasks or to gain access to more applications.

While the ability to switch between OSs is appreciated by users, certain aspects of dual-OS computing devices are unpopular with users. In particular, in certain situations, shutting down the computing device may be cumbersome and even result in data loss. For example, when a user is running a first OS and the second OS is suspended, the user may be required to shut down the first OS, then enter the second OS, and then shut down the second OS before fully powering down the computing device. Among other things, this may be time consuming and unnecessarily repetitive. Furthermore, in situations where the computing device needs to promptly and automatically shut down due to a low battery event or thermal event, data associated with one OS may be saved but the data associated with the other OS may be lost. This may be inconvenient or even disastrous for the user, depending on the type of data lost.

Aspects of the present disclosure may address at least the above deficiencies associated with dual-OS computing devices by providing an approach to shut down and/or initialize a dual-OS device. More particularly, aspects of the present disclosure implement operations in the computing device's BIOS component, chipset, and/or storage device to enable the computing device and associated OSs to be shut down and/or restored in a prompt and user friendly manner and without data loss.

For example, in one implementation, a process to initialize and shut down a computing device includes, during initialization of a computing device, utilizing a BIOS to program a chipset to generate a system management interrupt (SMI) in response to receiving a shutdown and/or hibernate command from a first OS or from a second OS. The BIOS then loads the first OS from a first partition in a storage device to a first memory portion and loads the second OS from a second partition in the storage device to a second memory portion. The computing device then runs the first OS while suspending the second OS. Thereafter, in response to the chipset receiving a shutdown command from the first OS (e.g., in response to a thermal or low battery event), the chipset sends the SMI to the BIOS component and the BIOS component causes the aspects of the second OS (e.g., the current environment associated with the second OS) to be stored in a third partition within the storage device Thereafter, the computing device shuts down and, when the user powers-up the computing device, the BIOS loads the first OS from the first partition to the first memory portion and restores the second OS from the third partition to the second memory portion. As a result, even if there is an unexpected and automatic shutdown due to a thermal or battery event, data associated with the suspended second OS is not lost because the data is saved to and restored from the third partition. These and other aspects of the present disclosure are discussed further below with reference to various examples and figures.

Looking at FIG. 1, this figure depicts an example computing device 100 in accordance with one implementation of the present disclosure. The computing device 100 comprises a BIOS memory 102, a chipset 104, a storage device 106, and a memory 108. It should be readily apparent that the computing device 100 is a generalized illustration and that other elements may be added or existing elements may be removed, modified, or rearranged without departing from the scope of the present disclosure. For example, other components common to computing devices (e.g., displays, network interfaces, graphics cards, thermal components, and/or a central processing unit (CPU)) may be added without departing from the scope of the present disclosure.

The computing device 100 may be, for example, a notebook, desktop, tablet, workstation, smartphone, server, and/or gaming device. The BIOS memory 102 resides within the computing device 100, and comprises a non-volatile memory (e.g., Flash memory) with BIOS machine-readable instructions 128 programmed thereon. In some implementations, the BIOS 128 may be referred to as firmware and/or a UEFI. In general, the BIOS 128, when executed, conducts tasks such as, e.g., loading the OSs, conducing the power-on self-test (POST), initializing registers, and/or determining which devices are bootable. Furthermore, and as discussed in detail below with reference to various flow diagrams, the BIOS 128 includes various instructions including chipset programming instructions 120 to program the chipset, OS handling instructions 122 to manage communication with the OS(s), and interrupt handling instructions to manage interrupt processing 124.

The chipset 104 also resides within the computing device 100. The chipset 104 may include a northbridge and southbridge in some implementations, and generally may conduct tasks such as dataflow management between a CPU, memory 114, storage 106, and/or peripherals. Additionally, the chipset 104 may comprise completely or partially separate from the CPU in some implementations, while, in other implementations, at least a portion of the chipset 104 may be integrated into the CPU. Moreover, implementations, the chipset 104 may be referred to by another name, such as, e.g., the Platform Controller Hub (PCH). Furthermore, and as discussed in detail below with reference to various flow diagrams, the chipset includes command handling instructions 126 which are provided by the BIOS 128 during initialization, and which cause the chipset 104 to generate an interrupt and send the interrupt to the BIOS 128 in response to receiving a shutdown or hibernate notification from the first operating system or second operating system.

The storage device 106 comprises a non-volatile memory that stores the OS as well as other data/instructions. Depending on the implementation, the storage device 106 may be, for example, a hard disk drive (HDD), solid state drive (SSD), hybrid HDD/SSD drive, an optical disc (e.g., CD, DVD, and Blu-ray), tape storage. Flash memory, and/or non-volatile random access memory (NVRAM) such as memristor based memory, ferroelectric RAM (FRAM), magnetoresistive RAM (MRAM), phase change RAM (PRAM), and millipede RAM. As shown in FIG. 1, the storage device 106 includes multiple partitions, including at least a first partition 110, second partition 112, and third partition 114. The memory device 108 is a volatile memory that may serve as a temporary storage and working space for the OSs and/or applications. Examples include, but are not limited to, static random access memory (SRAM) and dynamic random access memory (DRAM).

Figure 2:
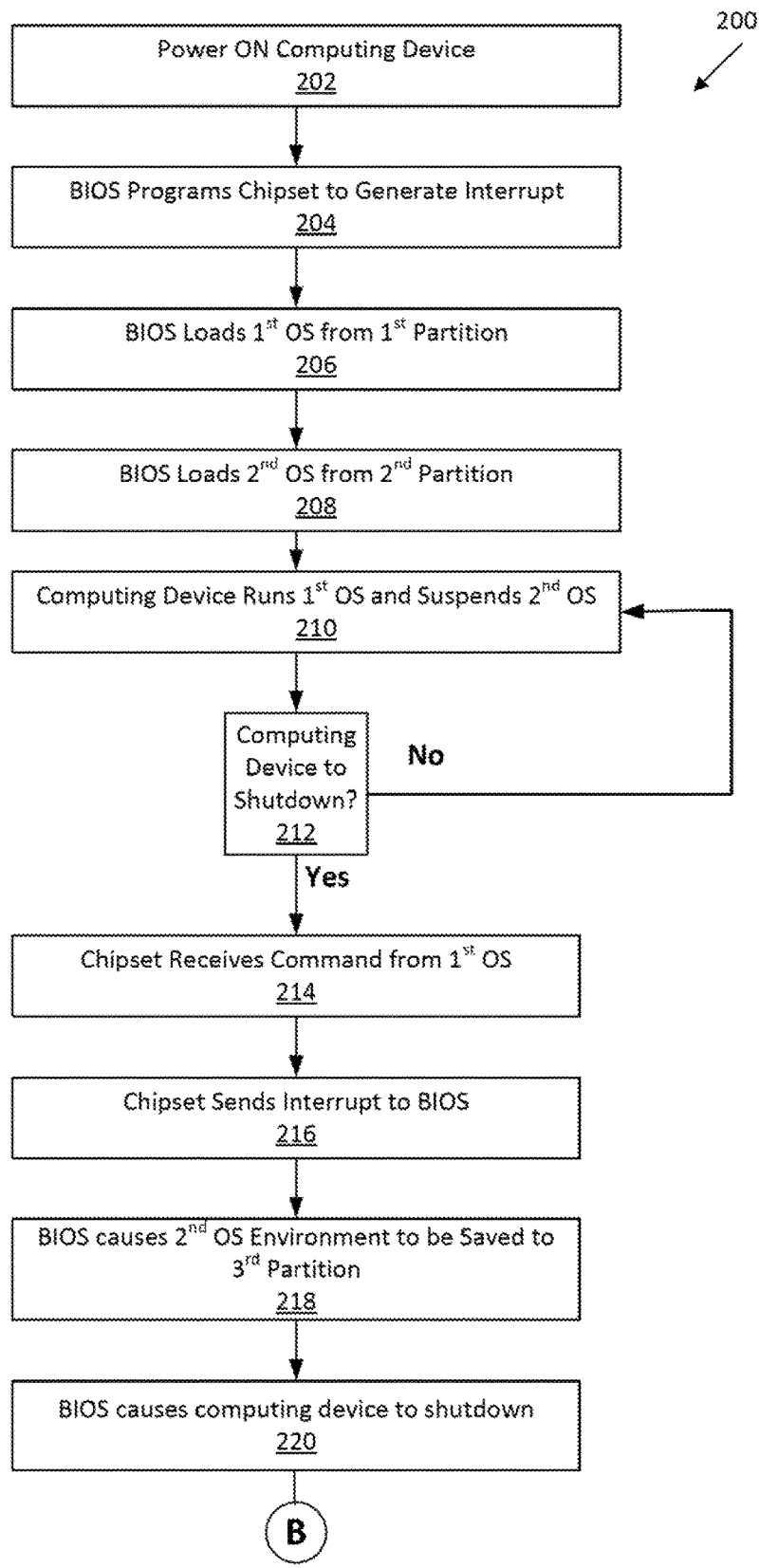
FIG. 2 depicts an example process flow diagram for computing device operation in accordance with an implementation of the present disclosure.

Turning now to the operations of the various above-discussed components in accordance with the present disclosure, FIG. 2 depicts a process flow diagram 200 for operation of the computing device 100 in accordance with an example implementation. It should be should be readily apparent that the processes depicted in FIG. 2 (as well as the other flow diagrams) represent generalized illustrations, and that other processes may be added or existing processes may be removed, modified, or rearranged without departing from the scope and spirit of the present disclosure. In addition, it should be understood that the processes depicted in FIG. 2 may represent instructions stored on a machine-readable storage medium (e.g., the BIOS memory 102, the storage device 106, and/or the memory 108) that, when executed, cause the computing, device 100 or components therein to respond, to perform actions, to change states, and/or to make decisions. Furthermore, the flow charts are not intended to limit the implementation of the present disclosure, but rather the flow charts illustrate functional information that one skilled in the art could use to generate instructions to cause a computing device 100 or components therein to perform the illustrated operations.

The process may begin at block 202, when the computing device 100 powers ON and begins initializing. This may be in response, for example, to the user depressing a power button on the computing device enclosure, or inputting a command via the computing device graphical user interface (GUI). At block 204, the BIOS 128 programs the chipset 104 to generate an interrupt in response to receiving a shutdown and/or hibernate command or notification from a first OS or from a second OS. The interrupt may be a system management interrupt (SMI), and more particularly, may be a sleep trap SMI (e.g., SPL_SMI or SmiControl_65). In some examples, the shut down or hibernate command/notification may be triggered by the OS setting values in a sleep control register. For example, the OS may set the SLP_TYPx to 4 or 5 and set the SLP_EN to 1.

At block 206, the BIOS 128 loads the first OS from a first partition 110 within the storage device 106 to a first memory portion 116. At block 208, the BIOS 128 loads the second OS from a second partition 112 within the storage device 106 to a second memory portion 118. Once both the first OS and second OS are loaded, a user has the ability to switch between the two OSs and use either for various tasks. When the user is running one OS, the other OS is suspended. Thus, for example, at block 210, the computing device may run the first OS and suspend the second OS.

Subsequently, at block 212, the computing device 100 determines if it is to shut down or hibernate. This may be in response to a thermal event such as when the computing device 100 detects that a component has exceeded a temperature threshold and therefore needs to promptly shutdown to avoid damage. Alternatively or in addition, this may be in response to a low battery event where the computing device 100 determines that the battery power level is at a low level and therefore needs to promptly shutdown. Moreover, this may be in response to a user-initiated shutdown or hibernate command.

Regardless of the triggering event, if the computing device 100 determines that it is to shut down or hibernate, at block 214, the currently executing first OS sends a shutdown or hibernate command to the chipset 104. As mentioned, the command may be triggered by the first OS setting a value in a sleep control register. For example, the OS may set the SLP_TYPx to 4 or 5 and set the SLP_EN to 1.

At block 216, in response to receiving the command, the chipset 104 sends an interrupt to the BIOS 128. As discussed, the command may be a SMI, and more particularly, the command may be a sleep trap SMI SLP_SMI or SmiControl_65).

At block 218, in response to receiving the interrupt, the BIOS 128 causes the current environment associated with the suspended second OS to be stored in a third partition 114 within the storage device 106. The second OS's current environment may include, for example, (i) the operational state of components associated with the computing device (e.g., the operational state of the CPU, chipset, GPU, codec, I/O component, and/or peripheral components), (ii) the context of at least one application (e.g., the state of a document in a word processing application and/or email draft in an email application), and/or (iii) the context of the first/second operating system prior to shutdown (e.g., process(es) state (e.g., new, ready, running, waiting, terminated), application state, user login status, register entries, and/or scheduling information). Furthermore, by storing the second OSs environment prior to shut down within the third partition 114, data associated therewith is accessible and may be restored when the computing device 100 is restarted. Hence, data associated with the second OS is not lost in response to, e.g., an automatic shutdown in response to a thermal or low battery event.

At block 220, the entire computing device 100 shuts down. It should be understood that between the processes at block 218 and block 220, the computing device 100 may conduct various additional processes such as shutting down applications and saving other information to the storage device 106. Moreover, the BIOS 128 may determine which OS was running and suspended when the interrupt was received. The BIOS 128 may store this status information and utilize it when the computing device is powered ON again to restore aspects of at least the suspended OS.

Figure 3:
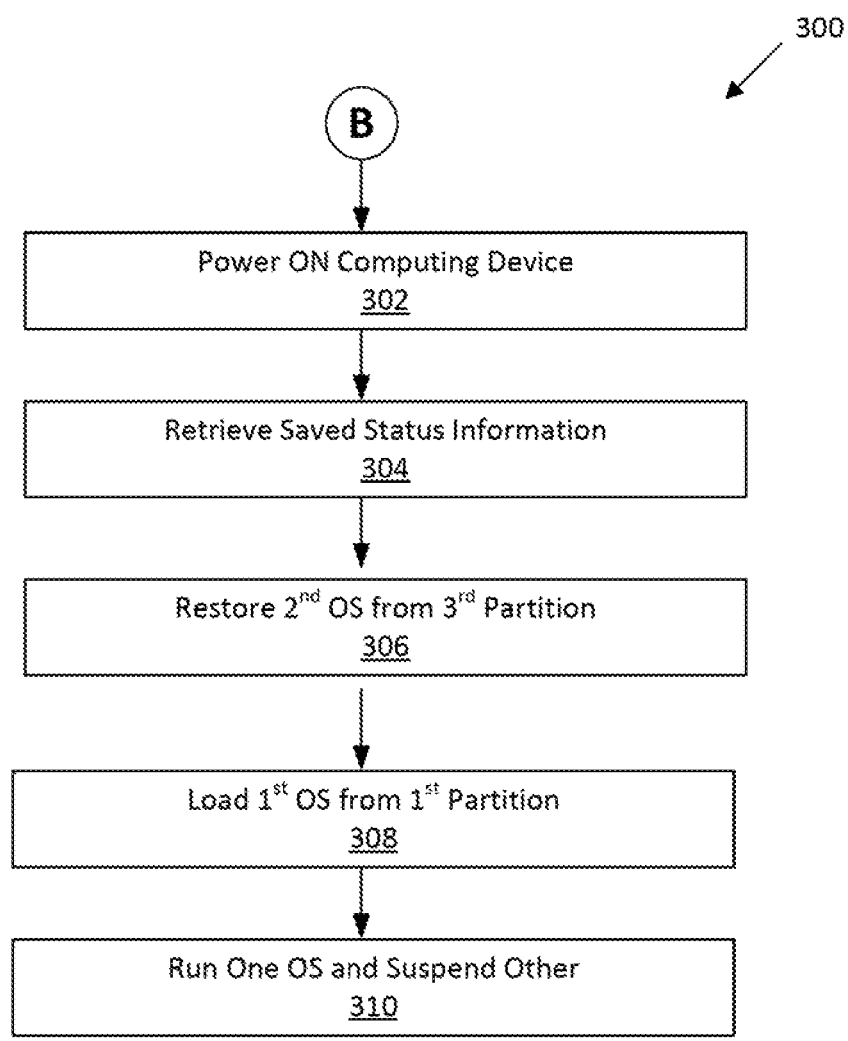
FIG. 3 depicts an example process flow diagram for computing device operation in accordance with another implementation of the present disclosure.

Looking now at FIG. 3, this figure depicts a process flow diagram 300 for operation of the computing device 100 in accordance with an example implementation. In particular, FIG. 3 depicts processes that may be conducted when the computing device 100 is powered ON after conducting the processes in FIG. 2.

The process may begin at block 302, where the computing device is powered ON. This may be in response to, for example, the user depressing a power button on the computing device enclosure. At block 304, the BIOS 128 retrieves status information stored prior to the last shutdown. In particular, the BIOS 128 retrieves information indicating which OS was running and suspended prior to the last shutdown. For example, and continuing with the scenario described above with respect to FIG. 2, the BIOS 128 retrieves information indicating that the first OS was running and the second OS was suspended prior to the shutdown. Based thereon, at block 306, the BIOS 128 restores the second OS from the third partition 114 in the storage device 106 to the second memory portion 118. At block 308, the BIOS 128 loads the first OS from the first partition 110 in the storage device 106 to the first memory portion 118. Once both OSs are loaded, at block 310, the computing device runs one OS while suspending the other OS.

Figure 4:
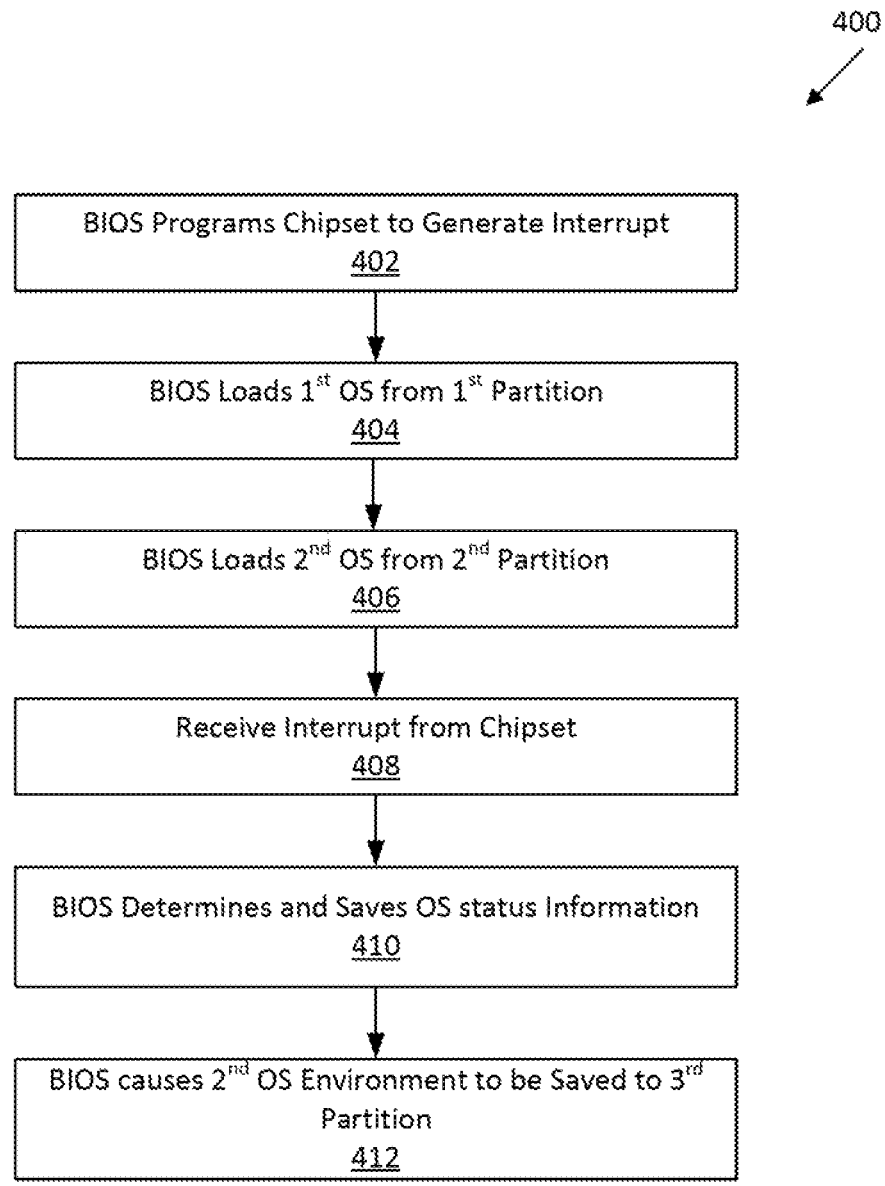
FIG. 4 depicts an example process flow diagram for computing device operation in accordance with yet another implementation of the present disclosure.

Turning now to FIG. 4, this figure depicts a process flow diagram 400 or operation of the computing device 100 in accordance with another example implementation. The process may begin at block 402, wherein the BIOS 128 programs the chipset 104 to generate an interrupt in response to receiving a shutdown/hibernate command from a first OS or from a second OS. The interrupt may be a system management interrupt (SMI), and more particularly, may be a sleep trap SMI (e.g., SLP_SMI or SmiControl_65). The shut down or hibernate command may be triggered by the OS setting values in a sleep control register. For example, the OS may set the SLP_TYPx to 4 or 5 and set the SLP_EN to 1.

At block 404, the BIOS 128 loads the first OS from a first partition 110 within the storage device 106 to a first memory portion 116. At block 406, the BIOS 128 loads the second OS from a second partition 112 within the storage device 106 to a second memory portion 118. Once both the first OS and second OS are loaded, a user has the ability to switch between the two OSs and use either for various tasks. When the user is running one OS, the other OS is suspended.

Subsequently, the computing device 100 determines it is to shut down or hibernate in response to, e.g., a thermal event, a low battery event, or a user-initiated command. This causes the running first OS to send a command to the chipset 104. As mentioned, the command may be triggered by the first OS setting a value in a sleep control register. For example, the OS may set the SLP_TYPx to 4 or 5 and set the SLP_EN to 1.

Thereafter, at block 408 and in response to receiving the command, the chipset 104 sends an interrupt to the BIOS 128. As discussed, the command may be a SMI, and more particularly, the may be a sleep trap SMI (e.g., SLP_SMI or SmiControl_65). At block 410, the BIOS 128 determines that the first OS is running and the second OS is suspended, and the BIOS 128 stores information indicating this status. Then, at block 412, the BIOS 128 causes the current environment associated with the suspended second OS to be stored in a third partition 114 within the storage device 106. The second OS's current environment may include, for example, (i) the operational state of components associated with the computing device (e.g., the operational state of the CPU, chipset, CPU, codec, I/O component, and/or peripheral components), (ii) the context of at least one application (e.g., the state of a document in a word processing application and/or email draft in an email application), and/or (iii)

the context of the first/second operating system prior to shutdown (e.g., process(es) state (e.g., new, ready, running, waiting, terminated), application state, user login status, register entries, and/or scheduling information). Furthermore, by storing the second OSs environment prior to shut down within the third partition 114, data associated therewith is accessible and may be restored when the computing device 100 is restarted. Hence, data associated with the second OS is not lost in response to, e.g., an automatic shutdown in response to a thermal or low battery event.

Figure 5:
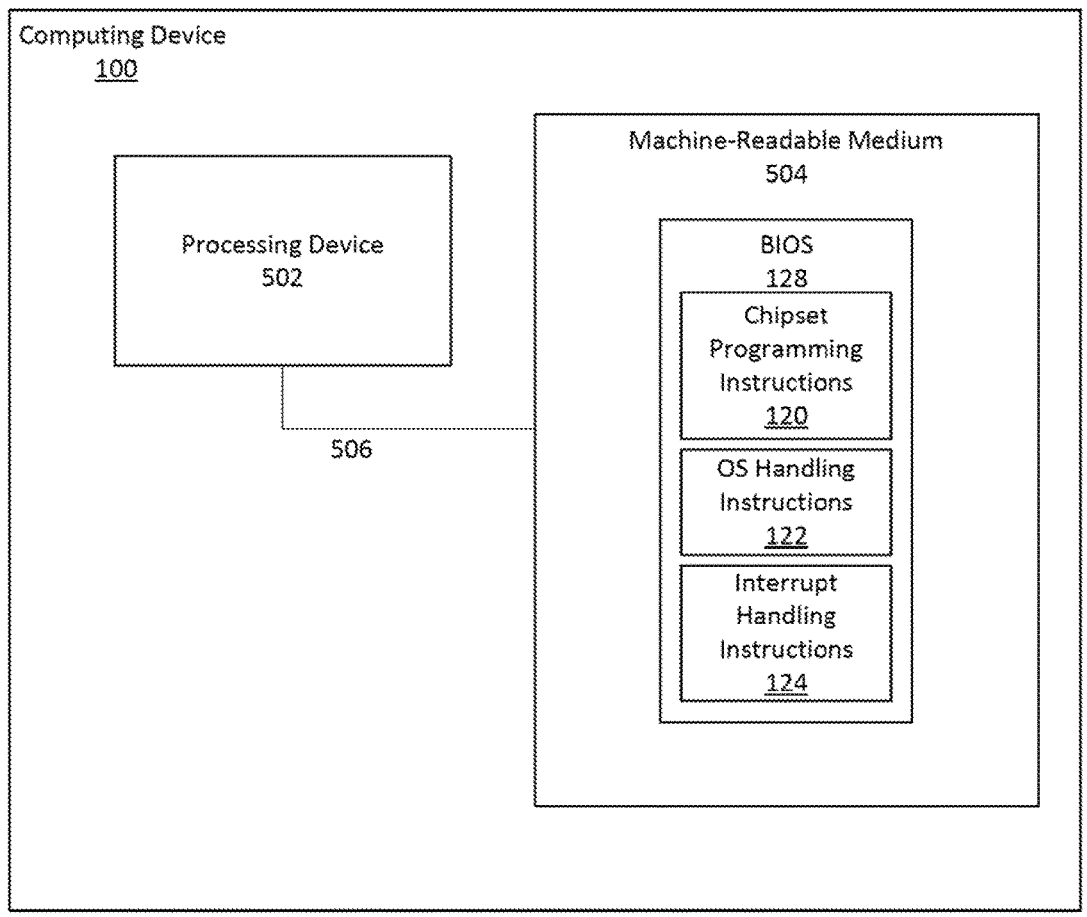
FIG. 5 depicts an example computer-readable medium implemented within a computing device in accordance with an implementation of the present disclosure.

Looking now at FIG. 5, this figure depicts an example non-transitory machine-readable medium 504 implemented on a computing device 100 in accordance with an implementation of the present disclosure. The computing device 100 may be, for example, a desktop, workstation, laptop, scientific instrument, gaming device, tablet, AiO desktop, smart television, hybrid laptop, detachable tablet/laptop, server, retail point of sale, or similar computing device. The computing device 100 comprises a processing device 502 and a non-transitory machine readable medium 504 coupled via a communication bus 506. It should be readily apparent that the computing device 100 is a generalized illustration and that other elements may be added or existing elements may be removed, modified, or rearranged without departing from the scope of the present disclosure. For example, the computing device 100 may include other components common to computing devices such as, for example, a network interface, a user interlace, fan, optical drive, power supply, and/or motherboard.

The processing device 502 may be, for example, at least one of a central processing unit (CPU), a semiconductor-based microprocessor, a graphics processing unit (GPU), and/or another processing device arranged to retrieve and execute instructions stored on the machine-readable storage medium 504. Put another way, the processing device 502 may fetch, decode, and execute instructions stored on the machine-readable storage medium 504 to implement the functionalities described above and below.

The machine-readable storage medium 504 may correspond to any typical storage device that stores machine-readable instructions, such as programming code, software, firmware, or the like. For example, the non-transitory machine-readable medium 502 may include one or more of a non-volatile memory, a volatile memory, and/or a storage device. Examples of non-volatile memory include, but are not limited to, electronically erasable programmable read only memory (EEPROM) and flash memory. Examples of volatile memory include, but are not limited to, static random access memory (SRAM) and dynamic random access memory (DRAM). Examples of storage devices include, but are not limited to, hard disk drives, compact disc read/write drives, digital versatile disc drives, optical read/write devices, and flash memory devices. In some examples, the BIOS instructions 128 may be part of an installation package that can be executed by the processing device 502. In this case, the non-transitory machine-readable medium 504 may be a portable medium such as a CD-RW disc, DVD-RW disc, flash drive, or a memory maintained by a server from which the installation package can be downloaded and installed. In another embodiment, the instructions may be part of an application already installed.

The BIOS instructions 128 comprise various instructions including chipset programming instructions 120 to program the chipset, OS handling instructions 122 to manage communication with the OS(s), and interrupt handling instructions to manage interrupt processing 124. Moreover, the BIOS instructions 128 may include instructions to cause the computing device 100 to conducts tasks such as, e.g., loading the OSs, conducing the power-on self-test (POST), initializing registers, and/or determining which devices are bootable.

The foregoing describes a novel and previously unforeseen approach to initialize, hibernate, and/or shutdown a dual-OS-computing device. Among other things, the approach Implement operations in the computing device's BIOS, chipset, and/or storage device to enable the computing device and associated OSs to be shut down and/or restored in a prompt and user friendly manner and without data loss. While the above disclosure has been shown and described with reference to the foregoing examples, it should be understood that other forms, details, and implementations may be made without departing from the spirit and scope of the disclosure that is defined in the following claims.

What is claimed is:

1. A method comprising:
   during initialization of a computing device, utilizing a basic input/output system (BIOS) to program a chipset to generate an interrupt in response to receiving a command from a first operating system or from a second operating system;
   loading, by the BIOS, the first operating system from a first partition in a storage device to a first memory portion;
   loading, by the BIOS, the second operating system from a second partition in the storage device to a second memory portion;
   executing, by the computing device, the first operating system and suspending the second operating system;
   receiving, at the chipset, the command from the first operating system;
   receiving, by the BIOS, the interrupt from the chipset;
   causing, by the BIOS, the current environment associated with the second operating system to be stored in a third partition in the storage device; and
   causing, by the BIOS, the computing device to shutdown.

2. The method of claim 1, wherein the command received at the chipset and sent from the first operating system is a shutdown command.

3. The method of claim 2, wherein the shutdown command is sent from the first operating system in response to a thermal event, a low battery event, or a user shutdown request event.

4. The method of claim 1, further comprising:
   determining, by the BIOS, the status of the first operating system and the second operating system prior to the shutdown; and
   storing, by the BIOS, status information associated with the first operating system and second operating prior to the shutdown.

5. The method of claim 4, further comprising:
   initializing, by the BIOS, the computing device in response to a power-on event, wherein the initializing the computing device comprises:
      retrieving the status information associated with the first operating system and second operating prior to the shutdown;
      restoring, by the BIOS, the second operating system from the third partition in the storage device to the second memory portion; and
      loading, by the BIOS, the first operating system from the first partition in the storage device to the first memory portion.

6. The method of claim 1, wherein the current environment associated with the second operating system comprises at least one of (i) the operational state of components associated with the computing device, (ii) the context of at least one application, and (iii) the context of the second operating system.

7. The method of claim 1, wherein the interrupt is a system management interrupt (SMI).

8. A computing device, comprising:
a memory including a first memory portion and a second memory portion;
a storage device including a first partition, a second partition, and a third partition;
a chipset to generate an interrupt in response to receipt of a command from a first operating system or from a second operating system; and
a basic input/output system (BIOS) to
program the chipset to generate the interrupt in response to receipt of the command from the first operating system or from the second operating system;
load the first operating system from the first partition to the first memory portion;
load the second operating system from the second partition to the second memory portion;
receive the interrupt from the chipset; and
cause the current environment associated with the second operating system to be stored in the third partition.

9. The computing device of claim 8, wherein the current environment associated with the second operating system comprises at least one of (i) the operational state of components associated with the computing device, (ii) the context of at least one application, and (iii) the context of the second operating system.

10. The computing device of claim 8, wherein the command is a shutdown command, and wherein the shutdown command is sent in response to a thermal event, a low battery event, or a user shutdown request event.

11. The computing device of claim 8, wherein the command is a hibernate command, and wherein the hibernate command is sent in response to a user request.

12. The computing device of claim 8, wherein the BIOS is further to:
determine the status of the first operating system and second operating system prior to shutdown; and
store status information to be used during subsequent computing device initialization.

13. The computing device of claim 8, wherein the interrupt is system management interrupt (SMI).

14. A computing device, comprising:
a memory including a first memory portion and a second memory portion;
a storage device including a first partition, a second partition, and a third partition;
a chipset to generate an interrupt in response to receipt of a shutdown command from a first operating system or from a second operating system, wherein the shutdown command is sent in response to a thermal event, a low battery event, or a user shutdown request event; and
a basic input/output system (BIOS) to
program the chipset to generate the interrupt in response to receipt of the shutdown command from the first operating system or from the second operating system;
load the first operating system from the first partition to the first memory portion;
load the second operating system from the second partition to the second memory portion;
receive the interrupt from the chipset;
determine the status of the first operating system and the second operating system;
store status information associated with the first operating system and the second operating system; and
cause aspects of the second operating system to be stored in the third partition.

15. The computing device of claim 14, wherein the BIOS is further to initialize the computing device in response to a power-on event by at least (i) restoring the second operating system from the third partition in the storage device to the second memory portion, and (ii) loading the first operating system from the first partition in the storage device to the first memory portion.

* * * * *

UNITED STATES PATENT AND TRADEMARK OFFICE
CERTIFICATE OF CORRECTION

PATENT NO. : 10,061,597 B2
APPLICATION NO. : 15/309542
DATED : August 28, 2018
INVENTOR(S) : Ming-Te Chang et al.

It is certified that error appears in the above-identified patent and that said Letters Patent is hereby corrected as shown below:

In the Drawings

In sheet 1 of 5, in FIG. 1, reference numeral 126, Line 2, delete "Hanlding" and insert -- Handling --, therefor.

Signed and Sealed this
Eighth Day of January, 2019

Andrei Iancu
*Director of the United States Patent and Trademark Office*